United States Patent
Okuno et al.

(10) Patent No.: US 7,234,328 B2
(45) Date of Patent: Jun. 26, 2007

(54) STEERING LOCK DEVICE

(75) Inventors: Masanari Okuno, Aichi (JP); Takeshi Murakami, Aichi (JP); Mitsuo Murakami, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 165 days.

(21) Appl. No.: 11/096,879

(22) Filed: Apr. 1, 2005

(65) Prior Publication Data
US 2005/0223761 A1   Oct. 13, 2005

(30) Foreign Application Priority Data
Apr. 7, 2004   (JP)   .............. 2004-113430

(51) Int. Cl.
*B60R 25/02* (2006.01)
(52) U.S. Cl. .......... 70/186; 74/492; 280/775; 280/777
(58) Field of Classification Search .......... 70/182–186, 70/252; 74/492, 493; 280/771, 775, 777
See application file for complete search history.

(56) References Cited

U.S. PATENT DOCUMENTS

| | | | | |
|---|---|---|---|---|
| 1,316,946 A | * | 9/1919 | Foster | 70/309 |
| 1,347,564 A | * | 7/1920 | Turner | 70/183 |
| 4,955,454 A | | 9/1990 | Reinert et al. | 180/287 |
| 7,007,525 B2 | * | 3/2006 | Okuno et al. | 70/186 |
| 2003/0160413 A1 | | 8/2003 | Kinme et al. | 280/89 |
| 2004/0182121 A1 | * | 9/2004 | Fukatsu et al. | 70/186 |
| 2004/0250577 A1 | * | 12/2004 | Watanuki et al. | 70/186 |
| 2005/0138977 A1 | * | 6/2005 | Suzuki et al. | 70/186 |

FOREIGN PATENT DOCUMENTS

| | | |
|---|---|---|
| DE | 2062388 | 12/1970 |
| JP | 2003-276564 | 10/2003 |

OTHER PUBLICATIONS

European Search Report, dated Jun. 17, 2005, issued in corresponding EPO Application No. EP 05 25 2013.

* cited by examiner

*Primary Examiner*—Lloyd A. Gall
(74) *Attorney, Agent, or Firm*—Synnestvedt & Lechner LLP

(57) ABSTRACT

A steering lock device including a sleeve assembly, a rear shaft rotated when a steering wheel is operated, and a lock bar for locking the steering shaft when engaged with a seat member fixed to the rear shaft. A sleeve assembly including an outer sleeve and an inner sleeve is shortened when the outer sleeve moves along the inner sleeve. The distal portion of the lock bar includes a slope that is abut against an open end of the inner sleeve. When the open end pushes the slope, the lock bar smoothly moves away from the steering shaft.

18 Claims, 9 Drawing Sheets

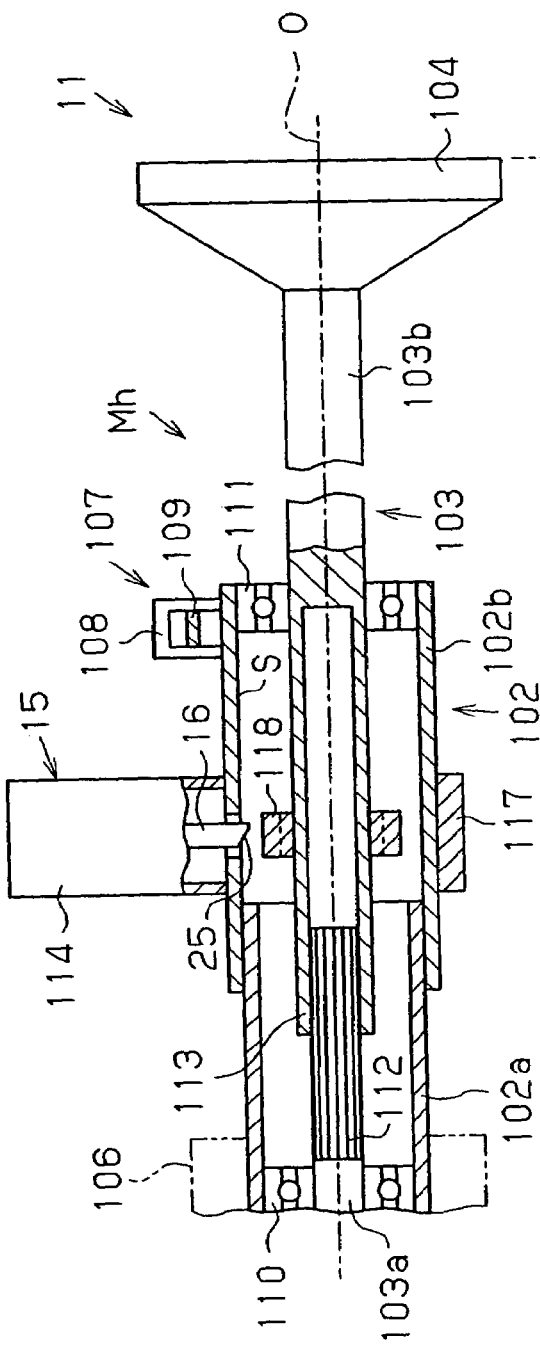
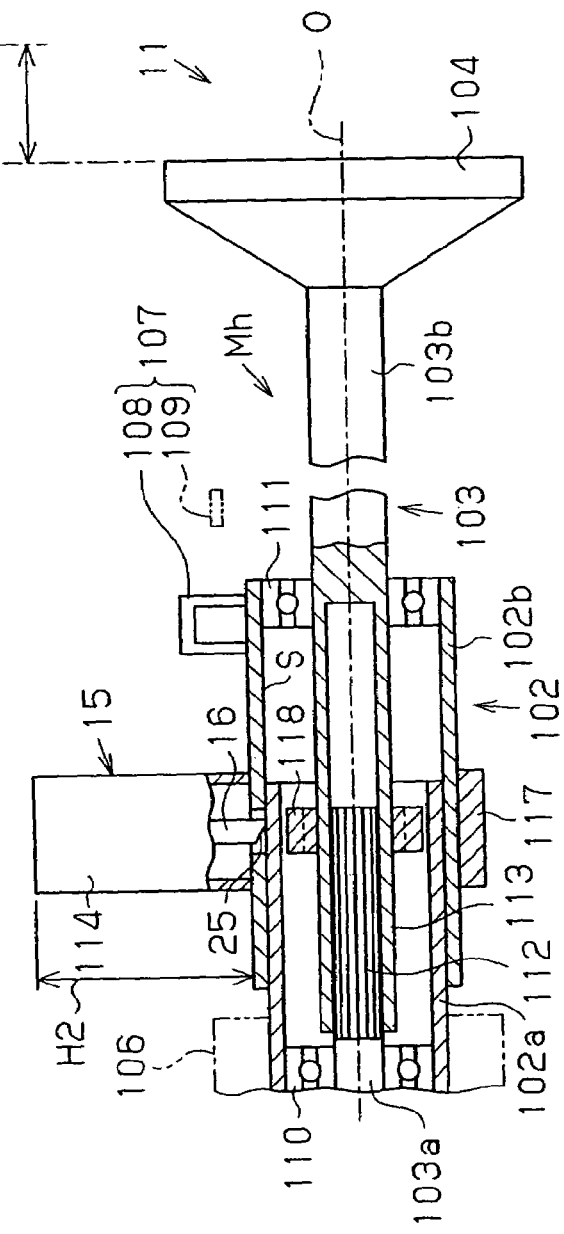
Fig.1A
Fig.1B

STEERING LOCK DEVICE

CROSS-REFERENCE TO RELATED APPLICATIONS

This application is based upon and claims the benefit of priority from prior Japanese patent application No. 2004-113430, filed on Apr. 7, 2004, the entire contents of which are incorporated herein by reference.

BACKGROUND OF THE INVENTION

The present invention relates to a steering lock device for vehicles.

In a conventional steering lock device, the drive force of a motor to electrically rotate a key cylinder or the force applied by a user to manually rotate the key cylinder moves a lock bar so that the lock bar is engaged with and disengaged from a steering shaft. The steering shaft is locked when engaged with the lock bar.

FIGS. 8A and 8B show a steering lock system 101 described in Japanese Patent Laid-Open Publication No. 2003-276564. The steering lock system 101 includes a sleeve assembly 102, a steering shaft assembly 103, a steering wheel 104, and a steering lock device 105. When a force (impact force) pushing the steering wheel 104 toward the front of the vehicle exceeds a predetermined value, the sleeve assembly 102 and steering shaft assembly 103 collapse to absorb the force.

The sleeve assembly 102 is formed by an inner sleeve 102a and an outer sleeve 102b. The inner sleeve 102a is arranged forward to the outer sleeve 102b in the vehicle. The basal portion (front end) of the inner sleeve 102a is connected to a base 106 fixed to the vehicle. The distal portion (rear end) of the inner sleeve 102a is received by the basal portion (front end) of the outer sleeve 102b.

A breakaway bracket 107 is arranged on the distal portion (rear end) of the outer sleeve 102b. The breakaway bracket 107 is formed by an engagement ring 108, which is fixed to the outer surface of the outer sleeve 102b, and a fixed hook 109, which is engaged with the engagement ring 108 and fixed to the vehicle body. When force pushing the outer sleeve 102b toward the front of the vehicle exceeds a predetermined value, the force is transmitted to the fixed hook 109 via the engagement ring 108 thereby breaking the fixed hook 109. This disengages the fixed hook 109 from the engagement ring 108 and enables the outer sleeve 102b to move toward the front of the vehicle.

Bearings 110 and 111 support the steering shaft assembly 103 in a manner rotatable relative to the sleeve assembly 102. The steering shaft assembly 103 includes a front shaft 103a, a rear shaft 103b, and a seat member 118 fixed to the rear shaft 103b. Part of the front shaft 103a is a spline shaft 112. The rear end of the spline shaft 112 is received in a spline boss 113 formed at the front end of the rear shaft 103b (see FIG. 9). The engagement between the spline shaft 112 and the spline boss 113 integrally rotates the shafts 103a and 103b. The shaft 103b is axially movable relative to the shaft 103a. A steering wheel 104 is fixed to the rear end of the rear shaft 103b.

The steering lock device 105 will now be described with reference to FIG. 10. The steering lock device 105 includes a main body portion 114 having a housing, a lock bar 115 arranged in the housing and moved by an actuator, and a mounting portion 116 for mounting the main body portion 114 to the outer sleeve 102b.

The mounting portion 116 has a curved surface 116a extending along the outer surface of the outer sleeve 102b. The steering lock device 105 is fixed to the outer sleeve 102b by fastening a fastening member 117 to the mounting portion 116.

The seat member 118, which is fixed to the rear shaft 103b, resembles a spur gear or the steering wheel of a vessel and has a plurality of radially extending projections 118a. The seat member 118 rotates integrally with the steering shaft assembly 103. A plurality of engaging recesses are defined between the projections 118a of the seat member 118. Rotation of the steering shaft assembly 103 is restricted when the distal portion of the lock bar 115 is received in one of the engaging recesses.

The distal portion of the lock bar 115 is box-shaped. FIG. 10 shows the lock bar 115 in a state located at a lock position. When moved to the lock position, the lock bar 115 extends through the outer sleeve 102b, and the distal portion of the lock bar 115 is arranged in an engaging recess defined between two adjacent projections 118a of the seat member 118. Abutment between the distal portion of the lock bar 115 and the two projections 118a defining the engaging recess restricts the rotatable angle range of the steering wheel 104. This locks the steering wheel 104.

When the lock bar 115 is located at an unlock position, the distal portion of the lock bar 115 is separated from the engaging recesses of the seat member 118. Thus, the steering wheel 104 is unlocked and rotatable.

As shown in FIG. 11A, the main body portion 114 includes a support member 120, for supporting the lock bar 115, and a coil spring 121, for resiliently connecting the lock bar 115 and the support member 120.

The support member 120 is moved by a drive device (not shown). The movement amount (amount of protrusion from the main body portion 114) of the lock bar 115 varies in accordance with the movement amount of the support member 120. The coil spring 121 is compressed when the lock bar 115 is forced towards the main body portion 114. The compression of the coil spring 121 enables the lock bar 115 to be moved towards the main body portion 114 without changing the movement amount of the support member 120.

FIG. 11A shows the lock bar 115 in a state located at the unlock position and the distal portion of the lock bar 115 facing towards an engaging recess between the projections 118a of the seat member 118. When the support member 120 moves from the state of FIG. 11A until the lock bar 115 reaches the lock position, the steering wheel 104 is locked, as shown in the state of FIG. 11B.

FIG. 11C shows a state in which the lock bar 115 is located at the unlock position and the distal portion of the lock bar 115 faces towards one of the projections 118a of the seat member 118. When the support member 120 moves from the state of FIG. 11C until the lock bar 115 stops at a position where it abuts against the projection 118a, the coil spring 121 is compressed, as shown in the state of FIG. 11D. In the state of FIG. 11D, the lock bar 115 is not located at the lock position. Thus, the steering wheel 104 is not locked. When the steering wheel 104 is rotated from the state of FIG. 11D, the biasing force of the coil spring 121 moves the lock bar 115 to the lock position. Thus, the distal portion of the lock bar 115 is received in an engaging recess between the projections 118a to lock the steering wheel 104. In this state, as shown in FIG. 11B, the coil spring 121 is extended and the protrusion amount of the lock bar 115 becomes maximal. In this manner, even if the lock bar 115 faces one of the projections 118a, the coil spring 121 moves the support member 120 in a preferable manner.

The steering wheel 104, the rear shaft 103b, the seat member 118, the bearing 111, the outer sleeve 102b, the steering lock device 105, the fastening member 117, and the engagement ring 108 form a movable component group Mz, which moves integrally along the axis of the steering shaft assembly 103. When a force pushing the steering wheel 104 towards the front of the vehicle exceeds a predetermined value, the force is transmitted to the fixed hook 109 via the engagement ring 108 and breaks the fixed hook 109. This moves the movable component group Mz toward the front of the vehicle.

In the conventional steering lock system 101, a problem may occur unless a distal end face 115a of the lock bar 115 is accurately positioned at the unlock position. That is, the minimum amount of protrusion of the lock bar 115 from the main body portion 114 must be accurately determined as described below. FIG. 12 shows an example in which, when the lock bar 115 is in the unlock position, the distal end face 115a of the lock bar 115 protrudes inwards from the inner surface S of the outer sleeve 102b. If such a case, the collapse of the sleeve assembly 102 would be interfered when the lock bar 115 abuts against the open end 43 of the inner sleeve 102a.

Therefore, as shown in the state of FIG. 13, when the lock bar 115 is located at the unlock position, the distal end face 115a of the lock bar 115 is arranged at an unlock level P1, which is outwards from the inner surface S of the outer sleeve 102b. When locking the steering wheel 104, the distal end face 115a of the lock bar 115 is located at a lock level P2. Accordingly, the lock bar 115 is moved by a distance corresponding to that between the unlock level P1 and the lock level P2 (drive distance L).

The steering lock device 105 becomes larger as the drive distance L of the lock bar 115 becomes longer. Accordingly, there is a demand for a compact steering lock device that shortens the drive distance L.

SUMMARY OF THE INVENTION

It is an object of the present invention to provide a compact steering lock device.

One aspect of the present invention is a steering lock device for locking a steering shaft. The steering lock device includes a sleeve assembly surrounding the steering shaft. The sleeve assembly includes an outer sleeve and an inner sleeve, which has an open end arranged in the outer sleeve. The outer sleeve is movable relative to and along the inner sleeve when the sleeve assembly is shortened. A main body portion is mounted on the outer sleeve. A lock member is supported by the main body portion. The lock member is movable between a lock position for restricting rotation of the steering shaft and an unlock position for enabling rotation of the steering shaft. The lock member has a distal portion engaged with the steering shaft when the lock member is located at the lock position. The distal portion of the lock member when located at the unlock position abuts against the open end of the inner sleeve in process of shortening of the sleeve assembly. At least one of the open end of the inner sleeve and the distal portion of the lock member includes a slope.

Another aspect of the present invention is a steering lock device for locking a steering shaft. The steering lock device includes a sleeve assembly surrounding the steering shaft. The sleeve assembly includes an outer sleeve and an inner sleeve, which has an open end arranged in the outer sleeve. A main body portion is mounted on the outer sleeve. The main body portion has a curved surface that contacts the outer surface of the outer sleeve. The curved surface extends about an axis. A lock member is supported by the main body portion. The lock member is moved between a lock position for restricting rotation of the steering shaft and an unlock position for enabling rotation of the steering shaft. The lock member has a distal portion engaged with the steering shaft when the lock member is located at the lock position. The distal portion of the lock member has at least one side surface extending in a direction intersecting the axis of the curved surface. The at least one side surface includes a slope that is abuttable against the inner sleeve.

A further aspect of the present invention is a steering lock device for locking a steering shaft having an axis. The steering lock device includes a sleeve assembly surrounding the steering shaft. The sleeve assembly includes an outer sleeve and an inner sleeve, which has an open end arranged in the outer sleeve. A main body portion is mounted on the outer sleeve. A lock member extends in a longitudinal direction that intersects the axis of the steering shaft and supported by the main body portion. The lock member is moved between a lock position for restricting rotation of the steering shaft and an unlock position for enabling rotation of the steering shaft. The lock member has a distal portion engaged with the steering shaft when the lock member is located at the lock position. The distal portion of the lock member has at least one side surface extending in the longitudinal direction. The at least one side surface includes a slope that is abuttable against the inner sleeve.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 1A and 1B are schematic diagrams showing a steering lock system according a first embodiment of the present invention;

DESCRIPTION OF THE PREFERRED EMBODIMENTS

Figure 2:
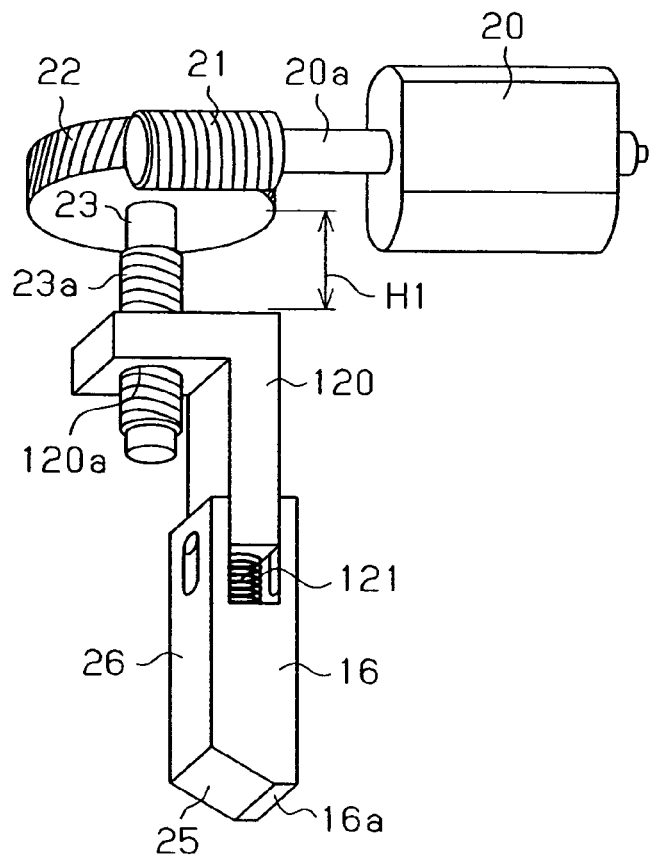
FIG. 2 is a partial perspective view showing the steering lock device of FIG. 1.

A steering lock system 11 according to a first embodiment of the present invention will now be described. To avoid redundancy, in the description of the first embodiment, like or same reference numerals are given to those components that are the same as the corresponding components of the conventional steering lock system 101 shown in FIGS. 8 to 13 and will not be described in detail.

Figure 10:
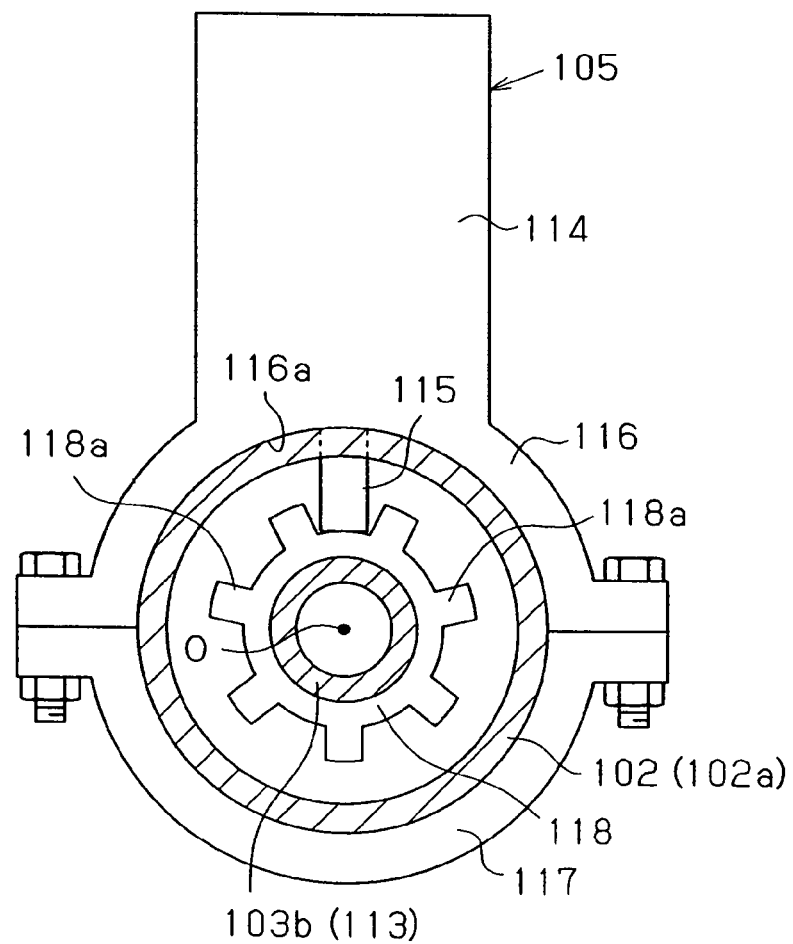
FIG. 10 is a cross-sectional view taken along line 10-10 in FIG. 8A.
Figure 11A:
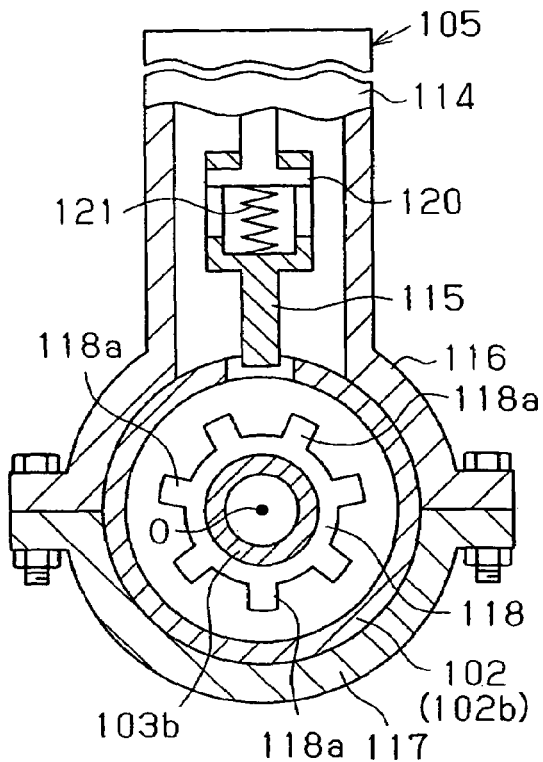
FIGS. 11A to 11D are cross-sectional views illustrating the operation of the conventional steering lock device.
Figure 11B:
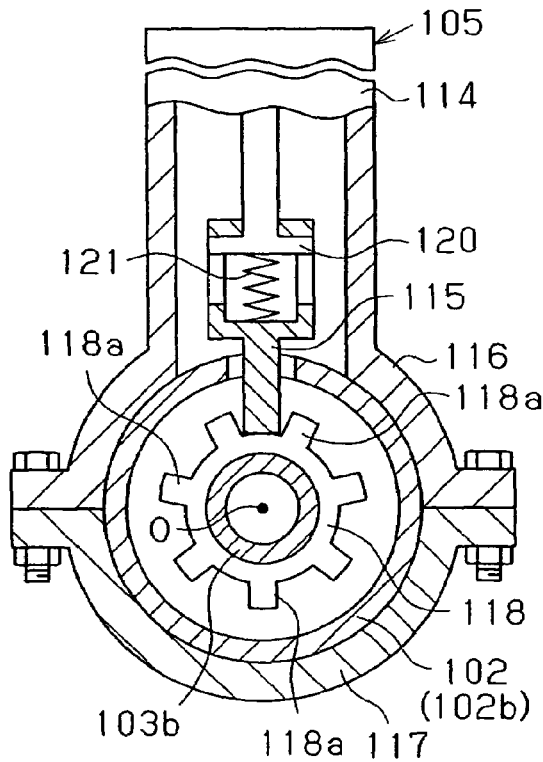
Figure 11C:
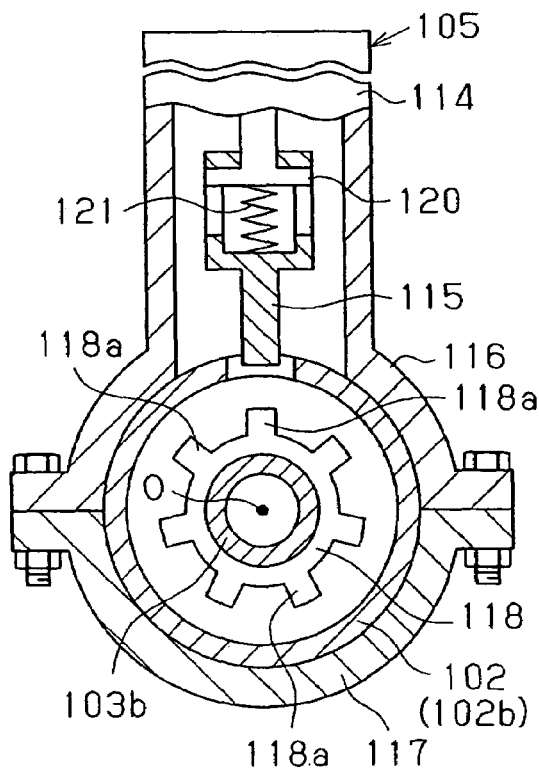
Figure 11D:
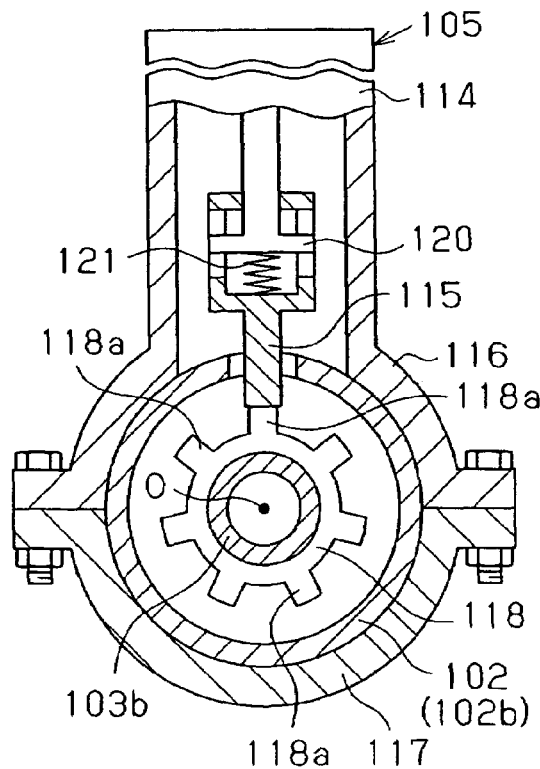
Figure 12:
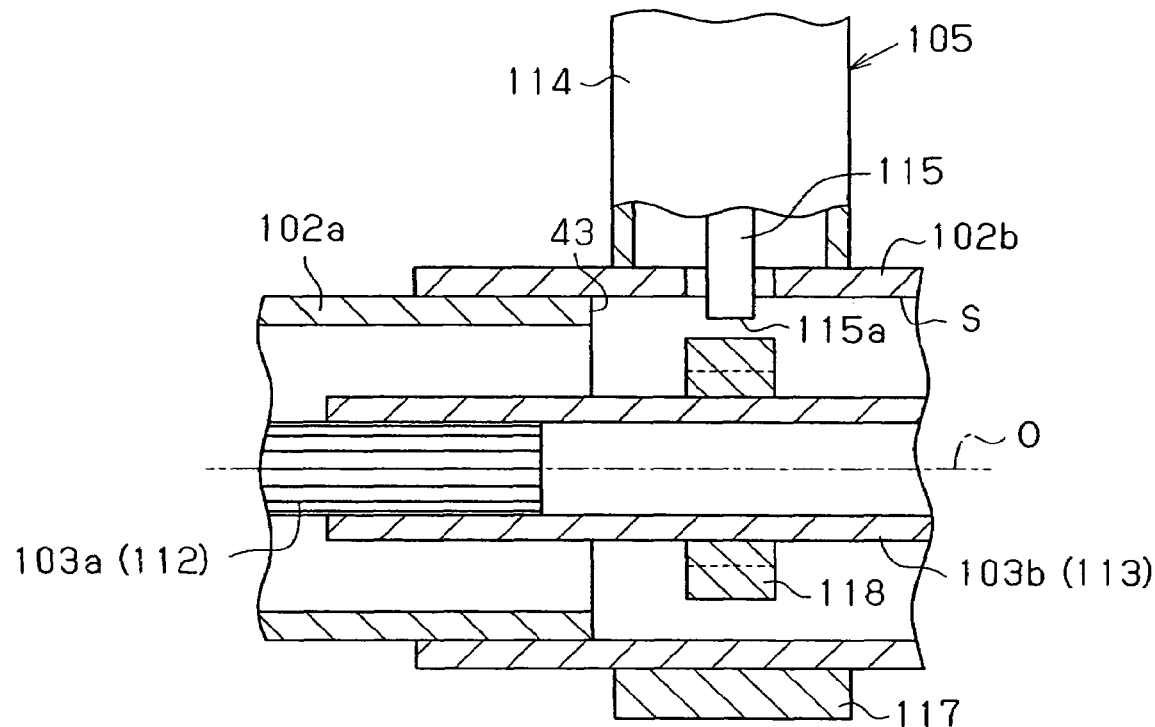
FIGS. 12 and 13 are partial cross-sectional views showing the lock bar of the conventional steering lock device located at different positions.

As shown in FIG. 1A, the steering lock system 11 includes a steering wheel 104, a steering shaft assembly 103 serving as a steering shaft to which the steering wheel 104 is attached, a sleeve assembly 102 covering the periphery of the steering shaft assembly 103, a base 106 supporting the basal portion of the sleeve assembly 102, a breakaway bracket 107 supporting the distal portion of the sleeve assembly 102, bearings 110 and 111 arranged between the sleeve assembly 102 and the steering shaft assembly 103, a steering lock device 15, and a fastening member 117 for mounting the steering lock device 15 to the sleeve assembly 102. The steering shaft assembly 103 includes a front shaft 103a, a rear shaft 103b, and a seat member 118 fastened to the rear shaft 103b. The steering lock device 15 includes a main body portion 114 having a housing, a lock bar 16 serving as a lock member, and a mounting portion 116 (FIG. 10). In the preferred embodiment, the shaft assembly 103 and the curved surface 116a are aligned along the same axis O. Further, the lock bar 16 longitudinally extends orthogonal to the axis O of the steering shaft assembly 103.

As shown in FIG. 2, the housing of the main body portion 114 accommodates an actuator such as a motor 20 having a rotational shaft 20a a worm 21 attached to the rotational shaft 20a, a worm wheel 22 meshed with the worm 21, a shaft 23 having a male threaded portion 23a, a support member 120 having a female threaded portion 120a receiving the male threaded portion 23a, a lock bar 16, and a coil spring (biasing means) 121 for resiliently connecting the support member 120 and the lock bar 16. The support member 120 functions as an adjustment member for moving the lock bar 16 in the longitudinal direction to adjust the amount of protrusion of the lock bar 16 from the main body portion 114 (the distance between the lock bar 16 and the seat member 118).

The worm 21, the worm wheel 22, and the shaft 23 (male threaded portion 23a) convert rotation of the rotational shaft 20a of the motor 20 is into linear movement of the support member 120. The support member 120, the coil spring 121, and the lock bar 16 are moved toward or away from the seat member 118 in accordance with the rotation direction of the shaft 23. Engagement of the distal portion of the lock bar 16 with the seat member 118 restricts rotation of the steering wheel 104 (steering shaft assembly 103). Disengagement of the distal portion of the lock bar 16 from the seat member 118 enables rotation of the steering wheel 104.

Figure 3:
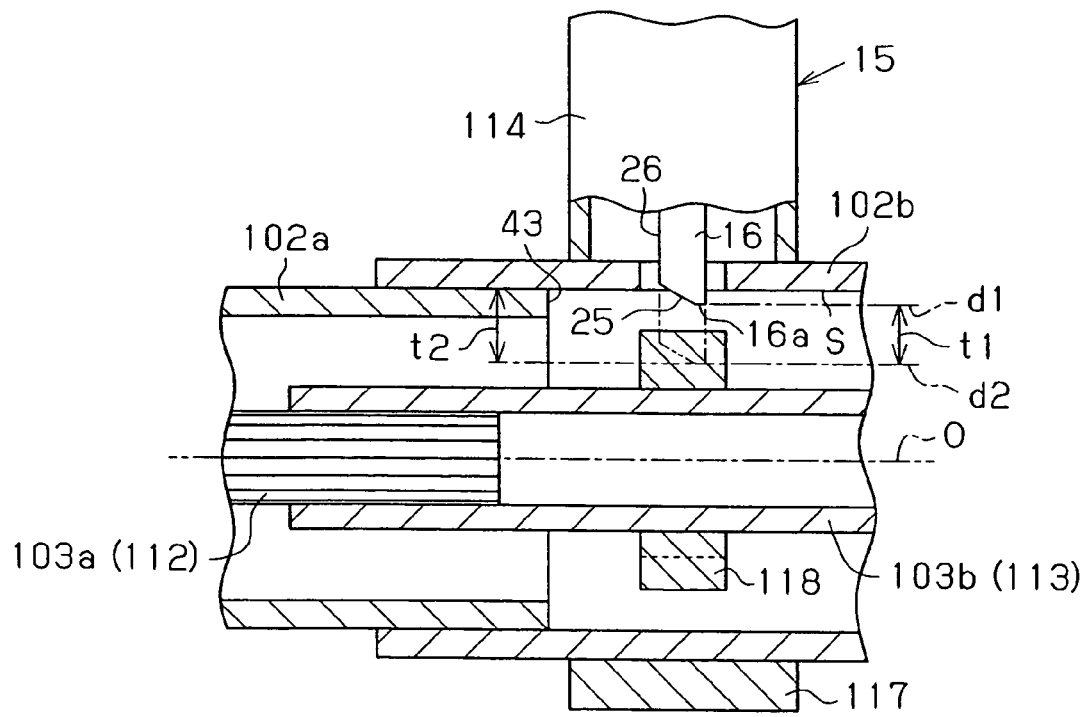
FIG. 3 is a schematic diagram illustrating the drive distance of a lock bar.

As shown in FIG. 3, a slope 25 is formed on the distal portion of the lock bar 16. Part of the slope 25 abuts against the open end 43 of the inner sleeve 102a. The slope 25 extends diagonal to the longitudinal direction of the lock bar 16, which is orthogonal to the axis O of the curved surface 116a of the mounting portion 116 (see FIG. 10) and is formed on the front side surface 26 of the lock bar 16. In the preferred embodiment, the slope 25 is a flat surface connecting a front side surface 26 and a distal end face 16a of the lock bar 16.

When the lock bar 16 is located at the unlock position, the distal end face 16a is arranged at an unlock level d1, which is inward from the inner surface S of the outer sleeve 102b (see FIG. 3). More specifically, when the lock bar 16 is located at the unlock position, the slope 25 extends across the inner surface S of the outer sleeve 102b, and at least a part of the slope 25 lies along the same level as the open end 43 and faces toward the open end 43 of the inner sleeve 102a.

Conversely, when the lock bar 16 is located at the lock position, the distal end face 16a is arranged at a lock level d2 and received in an engaging recess of the seat member 118. The distance between the unlock level d1 and the lock level d2 is referred to as a drive distance t1.

In FIG. 3, t2 indicates the distance between the inner surface of the outer sleeve 102b and the lock level d2. The moveable distance of the lock bar 16 relative to the support member 120, or the movable distance of the lock bar 16 toward the main body portion 114 without changing the position of the support member 120, is longer than distance t2.

The steering wheel 104, the rear shaft 103b, the seat member 118, the bearing 111, the outer sleeve 102b, the steering lock device 15, the fastening member 117, and the engagement ring 108 form a movable component group Mh, which moves integrally along the axis of the steering shaft assembly 103.

The operation and advantages of the steering lock system 11 will now be discussed.

Figure 4A:
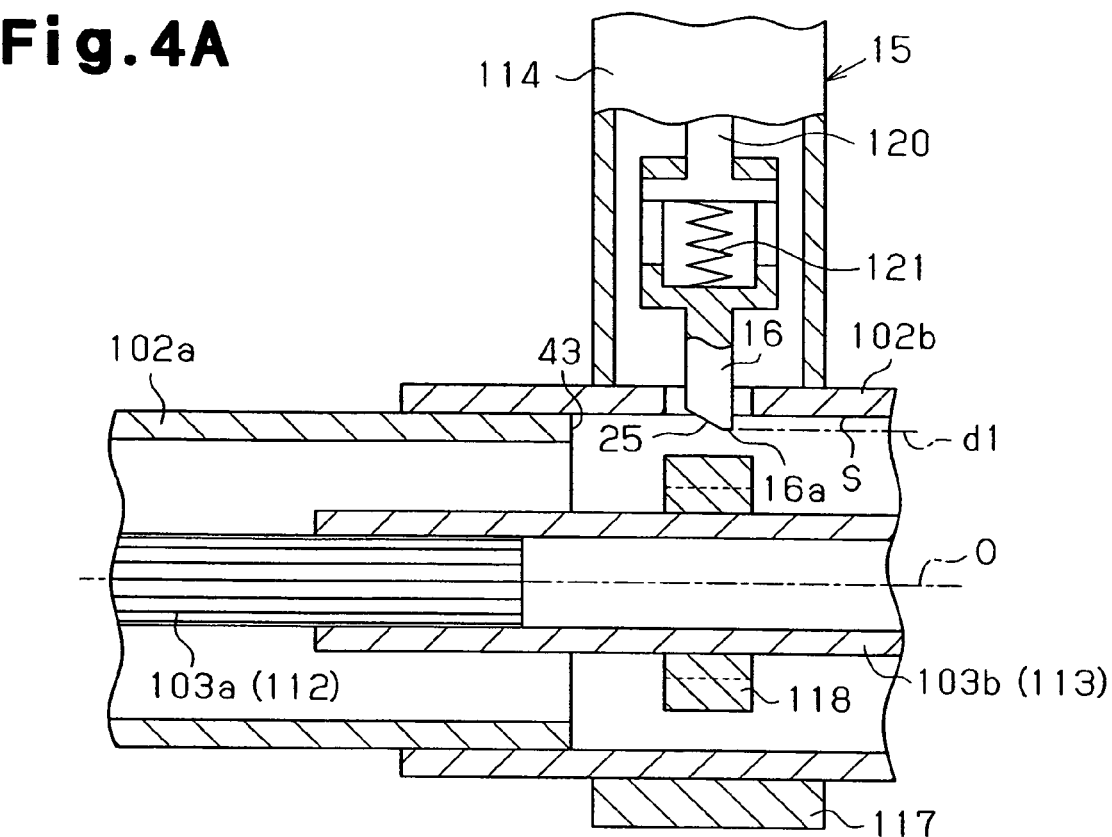
FIGS. 4A and 4B are respectively partial enlarged views of FIG. 1A and FIG. 1B.

(1) In the state shown in FIG. 4A, when a force pushing the steering wheel 104 towards the front of the vehicle exceeds a predetermined value with the distal end face 16a of the lock bar 16 located at the unlock level d1, the force is transmitted to a fixed hook 109 via an engagement ring 108 to break the fixed hook 109. This disengages the fixed hook 109 from the engagement ring 108 and moves the movable component group Mh toward the front of the vehicle. As a result, as shown in the state of FIG. 1B, the sleeve assembly 102 and the steering shaft assembly 103 collapse.

Figure 4B:
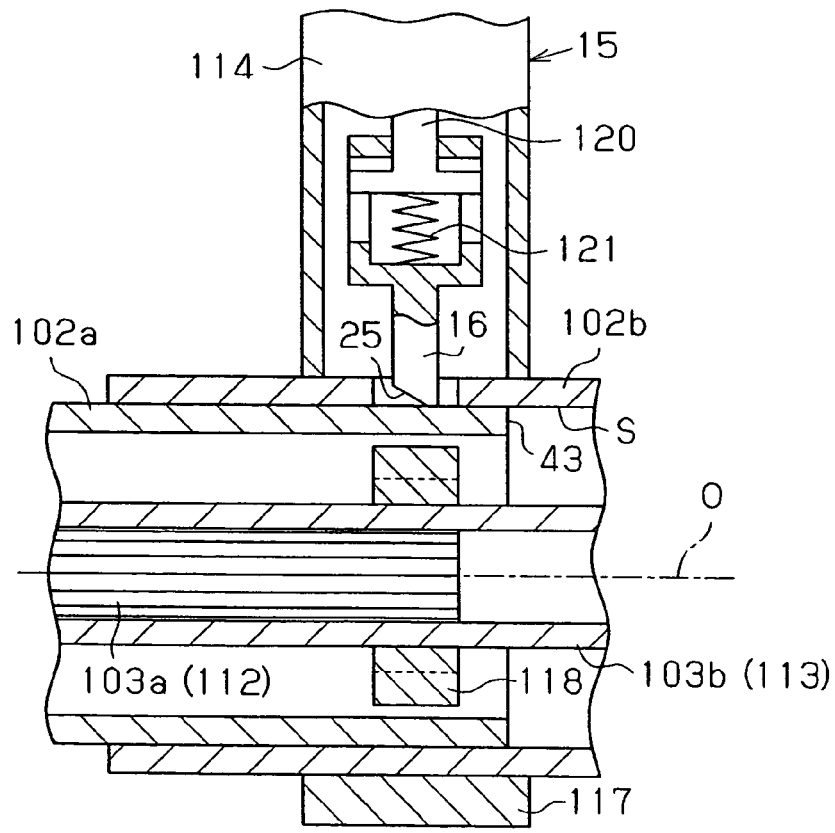

When the sleeve assembly 102 collapses, that is, when the outer sleeve 102b moves relative to the inner sleeve 102a and the overlap amount of the outer sleeve 102b and the inner sleeve 102a increases, the open end 43 of the inner sleeve 102a abuts against the slope 25 of the lock bar 16. As the sleeve assembly 102 further collapses, the open end 43 of the inner sleeve 102a is pushed against the slope 25 of the lock bar 16. The slope 25 converts the pushing force of the inner sleeve 102a into a force that moves the lock bar 16 toward the main body portion 114. Thus, the open end 43 pushes and smoothly moves the lock bar 16 toward the main body portion 114, as shown in the state of FIG. 4B.

Even if the distal portion of the lock bar 16 is located at an inner side than the inner surface S of the outer sleeve 102b, the outer sleeve 102b is not inhibited from sliding relative to the inner sleeve 102a. The sleeve assembly 102 thus can be contracted appropriately.

In the conventional steering lock device 105, the unlock level P1 of the distal end face of the lock bar 115 is required to be set at an outer side than the inner surface S of the outer sleeve 102b. For this reason, the drive distance L of the lock bar 115 is relatively long. In contrast, in the steering lock device 15 according to the first embodiment, the unlock level d1 of the distal end face of the lock bar 16 can be set at an inner side than the inner surface S of the outer sleeve 102b. Consequently, the drive distance t1 of the lock bar 16 (see FIG. 3) is shorter than the drive distance L of the conventional steering lock device 105 (see FIG. 13).

As the drive distance t1 decreases, the movable distance H1 of the support member 120 also decreases. Therefore, in the first embodiment, the main body portion 114 has a height H2 (see FIG. 1B), which is less than that in the prior art. As the main body portion 114 is reduced in size, the amount of material used to form the housing of the main body portion 114 becomes less. This lowers the manufacturing cost of the steering lock device 15 and reduces the weight of the steering lock device 15.

(2) The lock bar 16 is moved toward the main body portion 114 against the biasing force of the coil spring 121 when the inner sleeve 102a pushes the slope 25 of the lock bar 16. The movement amount of the lock bar 16 is absorbed by the elastic compression of the coil spring 121. Thus, the support member 120 remains at the same position. Further, the support member 120, the shaft 23, the worm wheel 22, the worm 21, and the motor 20 are not rotated. Even if the lock bar 16 is suddenly moved towards the main body portion 114 by the inner sleeve 102a, damage would not be inflicted on the support member 120, the shaft 23, the worm wheel 22, the worm 21, and the motor 20. This prevents the steering lock device 15 from being damaged.

(3) The mechanism for elastically biasing the lock bar 16 towards the seat member 118 (the support member 120, the coil spring 121, and the lock bar 16) locks the steering shaft assembly 103 even when the lock bar 16 faces a projection 118a of the seat member 118. In this mechanism, the motor 20 may move the support member 120 to a predetermined position even when the lock bar 16 is in contact with a projection 118a due to the resilient compression of the coil spring 121. This prevents the burnout of the motor 20. Additionally, when the lock bar 16 is disengaged from the projection 118a by moving the steering wheel 104, the coil spring 121 expands elastically and moves the lock bar 16 to the lock position. Since this embodiment employs such a mechanism, the lock bar 16 is moved toward the main body portion 114 without changing the position of the support member 120.

A steering lock device 35 according to a second embodiment of the present invention will now be described with reference to FIG. 5.

Figure 5:
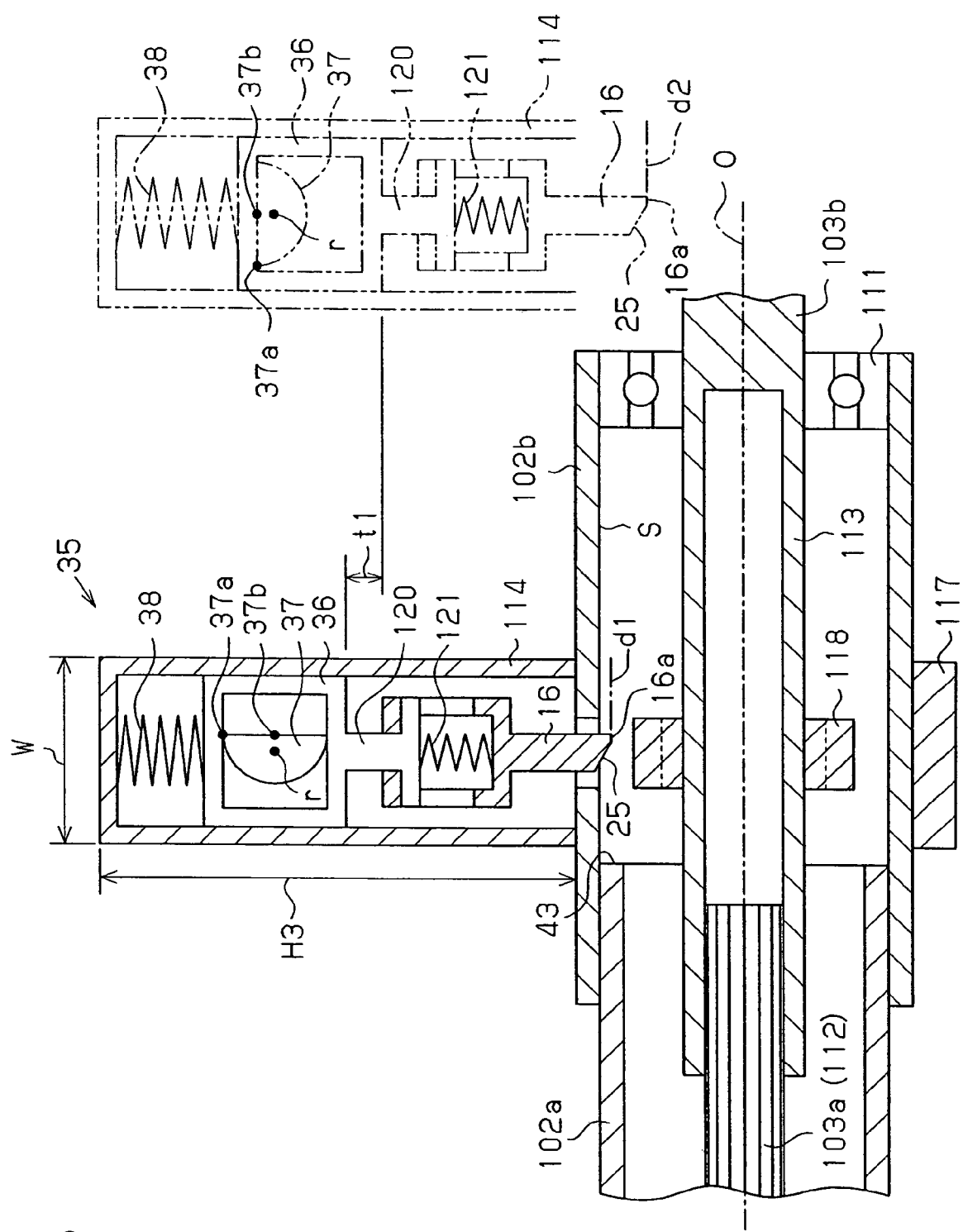
FIG. 5 is a schematic diagram showing a steering lock device according to a second embodiment of the present invention.

As shown in FIG. 5, instead of the shaft 23 (male threaded portion 23a) and the support member 120 (female threaded portion 120a) of to the first embodiment, the steering lock device 35 includes a cam mechanism for reciprocating the lock bar 16.

The housing of a main body portion 114 houses a support member 120 having a frame-shaped follower 36, a cam (driver) 37 arranged in the follower 36, a coil spring 38 biasing the follower 36 toward a sleeve assembly 102, a lock bar 16, and a coil spring 121 biasing the lock bar 16 toward a seat member 118.

The cam 37 may be rotated in cooperation with rotation of the rotational shaft 20a of the motor 20 or in cooperation with rotation of a key cylinder operated by the user. The cam 37 has a rotation axis r, a farthermost point 37a located farthest from the rotation axis r, and a nearmost point 37b located nearest to the rotation axis r.

When the farthermost point 37a of the cam 37 is in contact with the follower 36, as shown in the state indicated by the solid lines in FIG. 5, the distal end face 16a of the lock bar 16 is located at an unlock level d1. When the nearmost point 37b of the cam 37 is in contact with the follower 36, as shown in the state indicated by the broken lines in FIG. 5, the distal end face 16a of the lock bar 16 is located at a lock level d2.

In addition to the advantages of the first embodiment, the steering lock device 35 of the second embodiment has the advantages described below.

Figure 13:
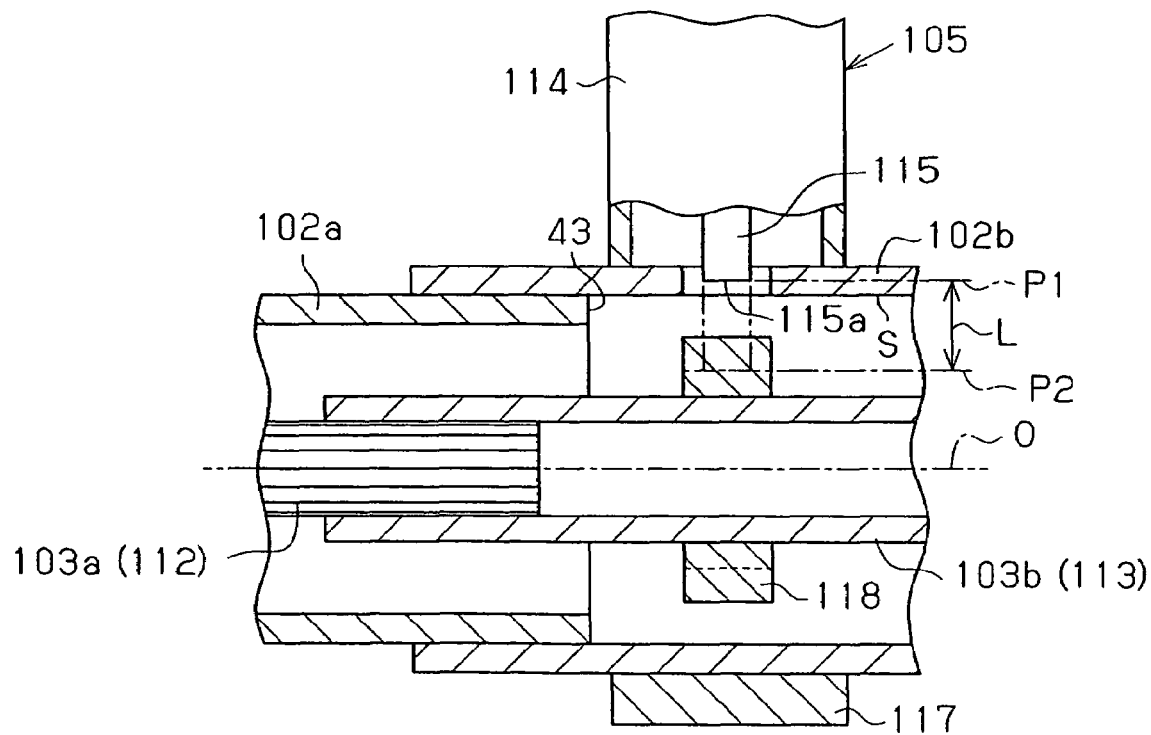

The drive distance t1 of the lock bar 16 (see FIG. 5) is shorter than the drive distance L of the conventional steering lock device 105 (see FIG. 13). The distance from rotation axis r to the farthermost point 37a may be reduced by the difference in the drive distances. Thus, the cam 37 may be reduced in size. When the size of the cam 37 is reduced, the follower 36 is also reduced in size. This enables the height H3 and width W of the housing in the main body portion 114 to be reduced. The size reduction of the cam 37, the follower 36, and the housing decreases the amount of material used to form these components, which in turn, lowers the manufacturing cost and reduces the weight of the steering lock device 35.

It should be apparent to those skilled in the art that the present invention may be embodied in many other specific forms without departing from the spirit or scope of the invention. Particularly, it should be understood that the present invention may be embodied in the following forms.

Figure 6A:
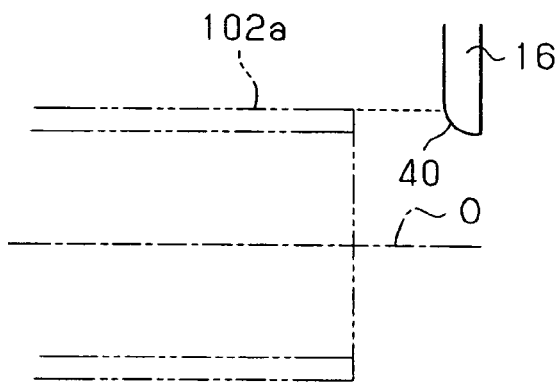
FIGS. 6A to 6C are schematic diagrams showing lock bars having various distal portions.
Figure 6B:
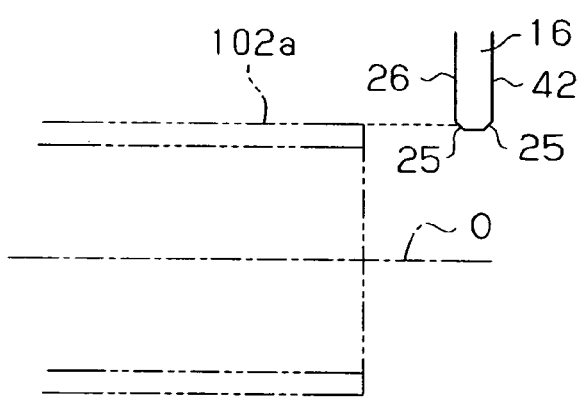
Figure 6C:
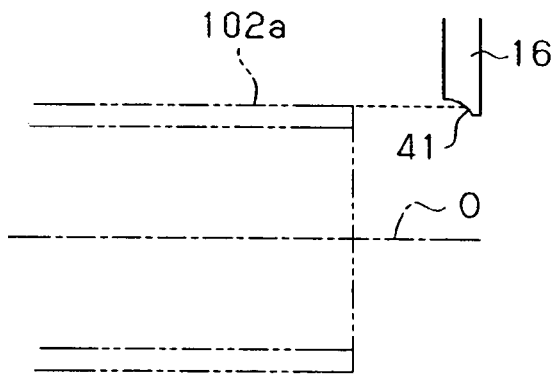

The slope 25 does not have to be a flat surface and may be a convex-shaped curved surface 40, as shown in FIG. 6A, or a concave-shaped curved surface 41, as shown in FIG. 6C.

Further, as shown in FIG. 6B, the lock bar 16 may have a slope 25 formed on both front side surface 26 and rear side surface 42. In this case, the lock bar 16 assumes a symmetrical. Therefore, when the lock bar 16 is attached to the support member 120, the lock bar 16 is prevented from being attached in the wrong direction.

Figure 7:
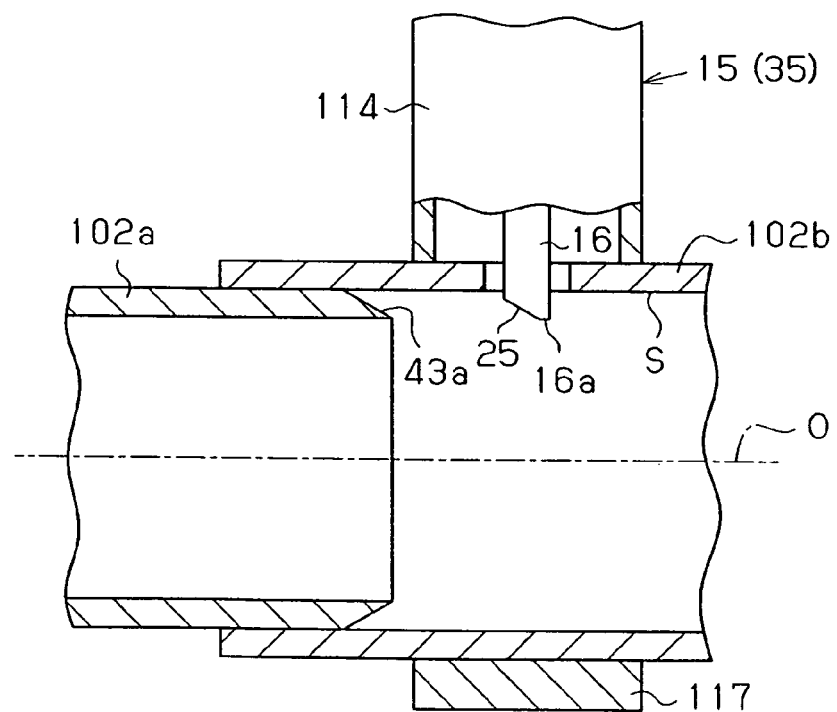
FIG. 7 is a schematic diagram showing a steering lock system according to a third embodiment of the present invention.
Figure 8A:
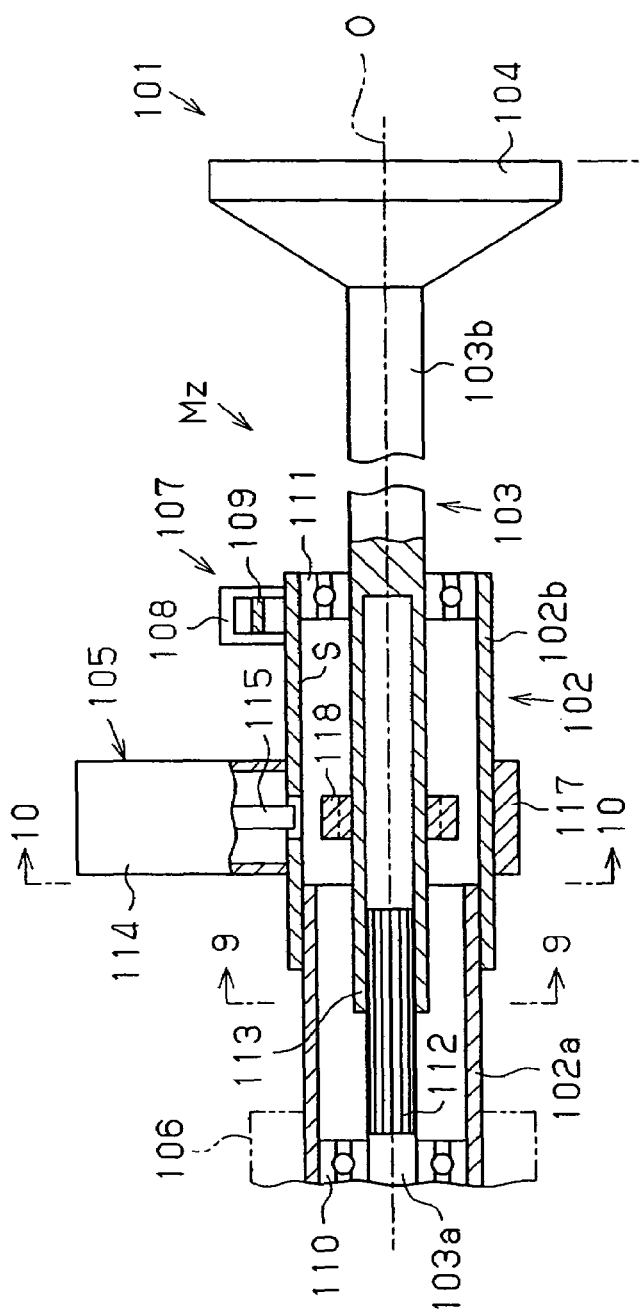
FIGS. 8A and 8B are schematic diagrams showing a conventional steering lock system.
Figure 8B:
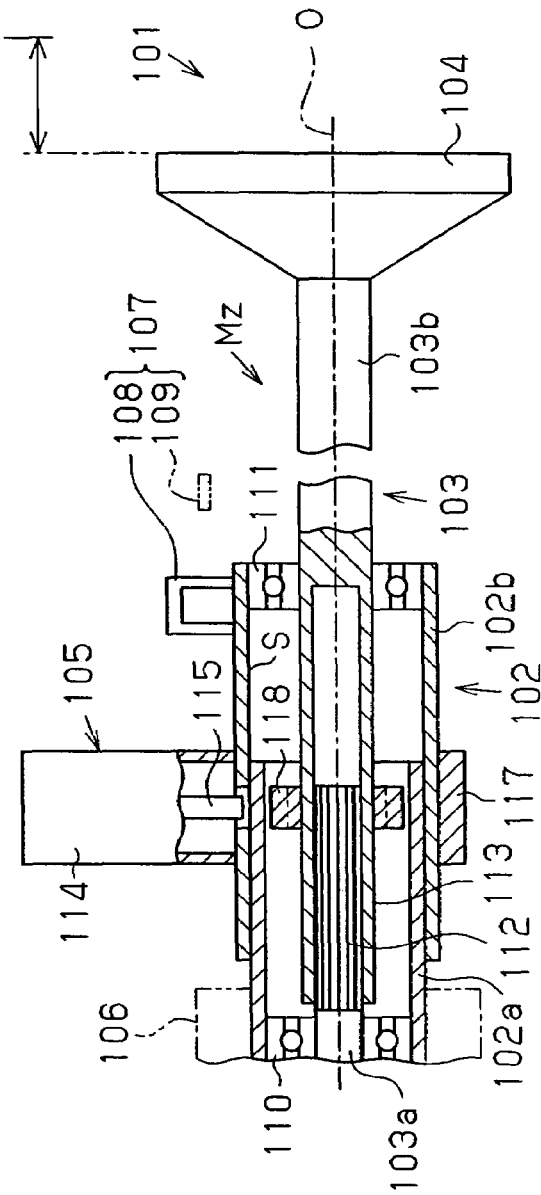
Figure 9:
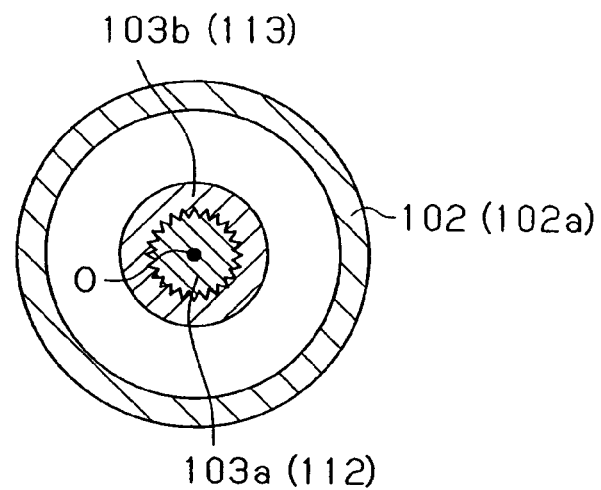
FIG. 9 is a cross-sectional view taken along line 9-9 in FIG. 8A.

Referring to FIG. 7, in a steering lock device according to a third embodiment of the present invention, the inner sleeve 102a has a slope 43a which comes into contact with the slope 25 of the lock bar 16. With this structure, even if the slope 25 of the lock bar 16 is entirely located inward from the inner surface S, the sleeve assembly 102 may appropriately be collapsed as long as at least part of the slope 25 of the lock bar 16 is at the same level as the slope 43a of the inner sleeve 102a. In this case, the inner sleeve 102a is also included in the steering lock device 15 or 35.

The slope 25 of the lock bar 16 may be omitted, and the distal portion of the lock bar 16 may be formed, for example, into a rectangular pillar shape. In place of the slope 25 of the lock bar 16, the inner sleeve 102a is formed with a slope 43a. In this case, the inner sleeve 102a is included in the steering lock device 15 or 35. With this arrangement, even if the distal portion of the lock bar 16 is located inward from the inner surface S, the sleeve assembly 102 may appropriately be collapsed as long as the distal portion of the lock bar 16 is located at the same level as the slope 43a.

In each of the above the embodiments, each of the steering lock devices 15 and 35 is configured so that the lock bar 16 is moved toward the main body portion 114 against the biasing force of the coil spring 121 when the inner sleeve 102a pushes the slope 25 of the lock bar 16 without changing the position of the support member 120. In other words, the steering lock devices 15 and 35 are provided with a mechanism including the support member 120, the coil spring 121, and the lock bar 16. However, the steering lock devices 15 and 35 do not need to be provided with such mechanism. More specifically, the steering lock devices 15 and 35 may be configured such when the inner sleeve 102a pushes the slope 25 of the lock bar 16, the lock bar 16 breaks and moves toward the main body portion 114.

The present examples and embodiments are to be considered as illustrative and not restrictive, and the invention is not to be limited to the details given herein, but may be modified within the scope and equivalence of the appended claims.

What is claimed is:

1. A steering lock device for locking a steering shaft, the steering lock device comprising:
   a sleeve assembly surrounding the steering shaft, the sleeve assembly including an outer sleeve and an inner sleeve having an open end arranged in the outer sleeve, the outer sleeve being movable relative to and along the inner sleeve when the sleeve assembly is shortened;
   a main body portion mounted on the outer sleeve; and
   a lock member supported by the main body portion, wherein:
   the lock member is movable between a lock position for restricting rotation of the steering shaft and an unlock position for enabling rotation of the steering shaft;
   the lock member has a distal portion engaged with the steering shaft when the lock member is located at the lock position, the distal portion of the lock member when located at the unlock position abuts against the open end of the inner sleeve in process of shortening of the sleeve assembly; and
   at least one of the open end of the inner sleeve and the distal portion of the lock member includes a slope.

2. The steering lock device according to claim 1, wherein the main body portion includes:
   an adjustment member, coupled to the lock member, for moving the lock member to adjust the distance between the lock member and the steering shaft; and
   a biasing means arranged between the lock member and the adjustment member, wherein when the biasing means receives a force pushing the lock member toward the main body portion, the biasing means is compressed by the force to enable movement of the lock member toward the main body portion without changing the position of the adjustment member.

3. The steering lock device according to claim 1, wherein the slope is a flat surface.

4. The steering lock device according to claim 1, wherein the slope is a convex-shaped curved surface.

5. The steering lock device according to claim 1, wherein the slope is a concave-shaped curved surface.

6. The steering lock device according to claim 1, wherein the steering shaft has an axis, the lock member extends in a longitudinal direction that is orthogonal to the axis of the steering shaft, and the slope converts the force applied to the distal portion of the lock member when pushed by the open end of the inner sleeve to a force that moves the lock member away from the steering shaft in the longitudinal direction.

7. A steering lock device for locking a steering shaft, the steering lock device comprising:
   a sleeve assembly surrounding the steering shaft, the sleeve assembly including an outer sleeve and an inner sleeve having an open end arranged in the outer sleeve;
   a main body portion mounted on the outer sleeve, the main body portion having a curved surface that contacts the outer surface of the outer sleeve, the curved surface extending about an axis; and
   a lock member supported by the main body portion, the lock member being moved between a lock position for restricting rotation of the steering shaft and an unlock position for enabling rotation of the steering shaft;
   wherein the lock member has a distal portion engaged with the steering shaft when the lock member is located at the lock position, the distal portion of the lock member has at least one side surface extending in a direction intersecting the axis of the curved surface, and the at least one side surface including a slope that is abuttable against the inner sleeve.

8. The steering lock device according to claim 7, wherein the main body portion includes:
   an adjustment member, coupled to the lock member, for moving the lock member to adjust the distance between the lock member and the steering shaft; and
   a biasing means arranged between the lock member and the adjustment member, wherein when the biasing means receives a force pushing the lock member toward the main body portion, the biasing means is compressed by the force to enable movement of the lock member toward the main body portion without changing the position of the adjustment member.

9. The steering lock device according to claim 7, wherein the slope is a flat surface.

10. The steering lock device according to claim 7, wherein the slope is a convex-shaped curved surface.

11. The steering lock device according to claim 7, wherein the slope is a concave-shaped curved surface.

12. The steering lock device according to claim 7, wherein the steering shaft has an axis, the lock member extends in a longitudinal direction that is orthogonal to the axis of the steering shaft, and the slope converts the force applied to the distal portion of the lock member when pushed by the open end of the inner sleeve to a force that moves the lock member away from the steering shaft in the longitudinal direction.

13. A steering lock device for locking a steering shaft having an axis, the steering lock device comprising:
   a sleeve assembly surrounding the steering shaft, the sleeve assembly including an outer sleeve and an inner sleeve having an open end arranged in the outer sleeve;
   a main body portion mounted on the outer sleeve; and
   a lock member extending in a longitudinal direction that intersects the axis of the steering shaft and supported by the main body portion, the lock member being moved between a lock position for restricting rotation of the steering shaft and an unlock position for enabling rotation of the steering shaft;
   wherein the lock member has a distal portion engaged with the steering shaft when the lock member is located at the lock position, the distal portion of the lock member has at least one side surface extending in the longitudinal direction, and the at least one side surface including a slope that is abuttable against the inner sleeve.

14. The steering lock device according to claim 13, wherein the main body portion includes:
   an adjustment member, coupled to the lock member, for moving the lock member to adjust the distance between the lock member and the steering shaft; and
   a biasing means arranged between the lock member and the adjustment member, wherein when the biasing means receives a force pushing the lock member toward the main body portion, the biasing means is compressed by the force to enable movement of the lock member toward the main body portion without changing the position of the adjustment member.

15. The steering lock device according to claim 13, wherein the slope is a flat surface.

16. The steering lock device according to claim 13, wherein the slope is a convex-shaped curved surface.

17. The steering lock device according to claim 13, wherein the slope is a concave-shaped curved surface.

18. The steering lock device according to claim 13, wherein the longitudinal direction of the lock member is orthogonal to the axis of the steering shaft, and the slope converts the force applied to the distal portion of the lock member when pushed by the open end of the inner sleeve to a force that moves the lock member away from the steering shaft in the longitudinal direction.

* * * * *